United States Patent [19]

Snowden

[11] Patent Number: 5,214,491
[45] Date of Patent: May 25, 1993

[54] APPARATUS AND METHOD FOR DETERMINING THE POSITION OF A FOOTBALL DURING A FOOTBALL GAME

[76] Inventor: James D. Snowden, 2304 Green Tee Dr., Pearland, Tex. 77581

[21] Appl. No.: 701,220

[22] Filed: May 16, 1991

[51] Int. Cl.$^5$ .................... G01B 11/00; G01C 15/00
[52] U.S. Cl. .................... 356/399; 33/289; 273/55 R
[58] Field of Search .................... 356/399–401; 33/289, 286; 273/55 R

[56] References Cited

U.S. PATENT DOCUMENTS 3,741,662 6/1973 Pioch .................... 356/399

Primary Examiner—F. L. Evans
Assistant Examiner—K. P. Hantis
Attorney, Agent, or Firm—Vinson & Elkins

[57] ABSTRACT

A method and apparatus for determining the position of a ball on a playing field during a game, for example a football in the game of American rules football, is disclosed. The apparatus includes a guide ramp having a length corresponding to the first down distance, having sighting lasers at each end and a spotting laser that moves along the guide ramp. At the beginning of a first down series, the guide ramp is moved to and anchored at a position at which one of the sighting lasers projects a mark corresponding to the position of the ball. If a play then occurs in which the ball is advanced to a location within the first down distance, the spotting laser is moved along the guide ramp until its projected mark corresponds to the position of the ball; if a loss-of-yardage play occurs in which the ball is located outside of the first down distance, the initial sighting laser can be removed from the guide ramp and moved to the ball location, connected to the guide ramp by way of a chain. A meter may be connected to the spotting laser to measure and display the distance from either or both ends of the guide ramp (yards advanced, yards to go).

15 Claims, 2 Drawing Sheets

APPARATUS AND METHOD FOR DETERMINING THE POSITION OF A FOOTBALL DURING A FOOTBALL GAME

BACKGROUND OF THE INVENTION

The conventional method of spotting the football during a football game relies upon the judgement of the officials and consists of using a metal chain and two poles which are 10 yards or 30 feet apart and are held by a "chainman". Another chainman holds a third pole to spot the football as play progresses. This chainman usually relies upon the on-field officials to help position him, and accordingly considerable judgement and approximation is associated with his positioning.

It is therefore an object of the present invention to revolutionize the sport of football whether it is on the amateur or professional level, by overcoming the current inaccurate and time consuming method is utilized to measure the progress of a football team, taking the guesswork out of the placement of the football to a degree of accuracy never before possible.

It is a further object of the present invention to accomplish the same precisely and quickly, thus allowing the game to progress without undue delays and unnecessary errors that presently occur within the existing method of placement of the football.

Other objects and advantages of the present invention will become apparent to those of ordinary skill in the art having reference to the following specification together with the drawings.

SUMMARY

According to the present invention, an apparatus and method are provided that can accurately determine the position of the football without the inherent delays and inaccuracy presently associated with the game of football. The invention may be incorporated into a system which includes three (3) lasers; two (2) sighting lasers and one (1) spotting laser on a guide track that is slightly over 10 yards or 30 feet in length. The sighting lasers are at the opposite ends of the track and are positioned exactly 10 yards or 30 feet apart. The spotting laser travels along the track between the sighting lasers and is utilized to precisely position the football.

Utilizing the method and apparatus according to the present invention, one (1) to two (2) personnel can precisely position the football without any guesswork or judgement. Additionally, the delay inherent in the chainmen running on the field to spot the ball will be totally eliminated with the invention being proposed in these specifications.

DETAILED DESCRIPTION OF THE PREFERRED EMBODIMENT

Figure 1:
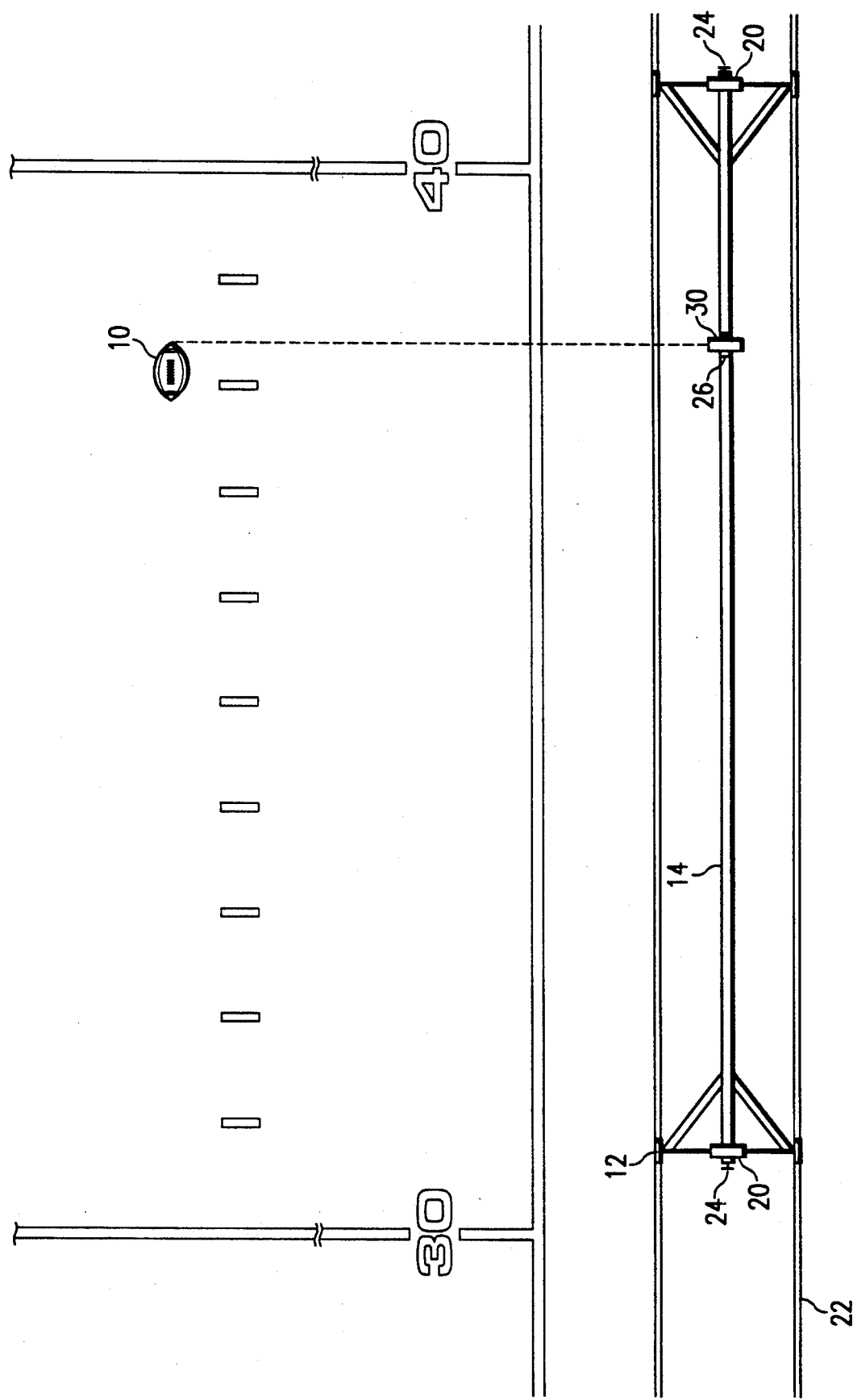
FIGS. 1 and 2 are plan and elevation views, respectively, of the football spotting apparatus according to the preferred embodiment of the invention.

Referring first to FIG. 1, football 10 is shown in a hypothetical position with the spotting laser 30 positioned. The dual reading yardage meters 26 show the yards to go and the yards traveled. The spotting laser 30 travels on a guide ramp 14 between the two (2) sighting lasers 20. When positioned initially, anchor pins 22 on natural turf or a locking mechanism on artificial surfaces will be employed to secure the system to prevent it from moving. Hard rubber tires 12, or alternatively guides, are provided to easily move the system and a depressed track 22 for the tires 12 or a buried track for the guides are provided for accuracy as well as safety. Two (2) bulls eyes 18 are also located under the sighting lasers 20 for visual indication and reference.

Figure 2:
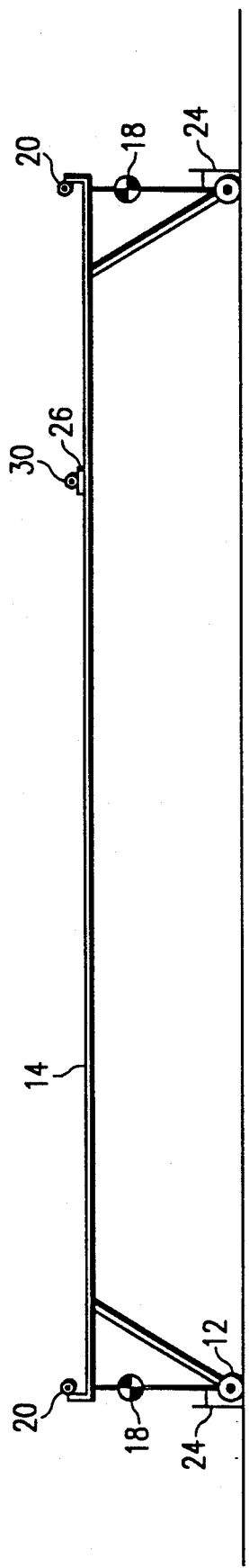

FIG. 2 shows the side view. This drawing shows the previously mentioned items from another perspective for complete clarification. The following is a detailed description of certain elements in the preferred embodiment of the invention, not by drawing since each item is represented on both sheets but rather by individual part.

1. Sighting Laser 20-Two (2) sighting lasers 20 are utilized, one (1) at either end of the, guide ramp 14, located on the order of ten inches thereabove, and on the order of five feet from the ground. Each functions in the same manner depending on the direction the football team is traveling. The lasers will be red for visual acuity and rather than a round beam the laser will project a mark such as a line on the field. The length of the line, will vary somewhat depending on the distance to the ball 10 but it is proposed to be not less than four (4) inches in length at the minimum. Iron sights are provided on the top of the laser for quickly locating the approximate position of the football 10 and then it is adjusted for the precise measurement. Each sighting laser 20 is removable and attached to a steel measuring chain in the event a reading is required on a measurement of greater than 10 yards but they are otherwise in a fixed position.

2. Spotting Laser 30-One (1) spotting laser is utilized. The function of spotting laser 30 is to precisely identify the position of the football 10 and to relocate it should the ball 10 be moved. The spotting laser 30 traverses the complete length of the guide ramp 14 with two (2) yardage meters 26 to indicate both the yards to go and the yards traveled. This laser is also red for visual acuity and will also project a mark such as a line a minimum of four (4) inches in length, on the field. An iron sight is also provided for ease of operation in quickly locating the approximate position of the football.

3. Laser Guide Ramp 14-The guide ramp 14 is the structure in which the spotting laser 30 traverses and is the main supporting structure. It also contains the steel measuring chain to allow for the spotting of the ball 10 a distance greater than 10 yards.

4. Hard Rubber Tires 12 or Guides-Four (4) tires 12 or guides are required for the proper stability. The tires 12 will travel in a depressed track 22 for accuracy and safety that is installed behind the playing field. If a buried track is utilized, ideally for artificial surfaces, guides will be employed with quick detachable inserts should the need arise to quickly move the system for example, to prevent players from running into it.

5. Anchor Pins 24-An anchor pin 24 on each end of guide ramp 14 is located at ground level to secure and to accurately hold the position of the system. The pins 24 are easily removable to allow the traversing of guide ramp 14 with sighting lasers 20 and spotting laser 30 to another position. In the alternative, locking mechanisms for the guides which are not shown will serve the same function as the anchor pins 24.

6. Bulls Eyes 18-Two (2) bulls eyes 18 are present for visual location of the first down distance. Although they are accurately positioned below each sighting laser 20 at precisely 10 yards or 30 feet apart, their function is primarily for benefit of the players and on-field officials who want to visually locate the ball 10 and the first down location in reference to their position on the field. Other visual references although not shown such as down markers to indicate the correct down may be included.

The operation of the preferred embodiment of the present invention will now be described, beginning with a first down play after positioning of football 10, for example on the 20 yard line. The system is moved into place and spotting laser 30 and one of the sighting lasers 20 are lined up to the front of football 10, to exactly locate its position on the field. As play progresses, the position of football 10 is marked by spotting laser 30 as the team advances, by way of a mark such as a line projected onto the field by spotting laser 30. Spotting laser 30 has two yardage meters 26, one on each side to indicate yards to go and yards traveled, respectively, from the initial starting point. If, for example, the first play is a running play, when the play is stopped football 10 is marked by the on-field official, and spotting laser 30 is moved into position to indicate the exact gain on that play. The actual spotting of football 10 by spotting laser 30 will be exact and the reading that is given to the on-field officials, the teams and the spectators can be as accurate as may be required; it is contemplated that the resolution of the reading will be to the tenth (0.1) of a yard or three tenths (0.3) of a foot. If, for example, the gain was to a point between the 24 and 25 yard line, after positioning of spotting laser 30, yardage meters 26 would show, for example, that the position of football 10 is at the 24.3 yard line, and that 4.3 yards were gained and 5.7 yards remain. For complete clarity of description if, for example, the next play were an incomplete pass, spotting laser 30 will not be moved, allowing the exact position of football 10 to be readily restored by spotting laser 30 indicating to the on-field official the proper position for football 10 for the next play. If, for example, on third down another running play that gained 5.6 yards occurred, football 10 will be about on the 30 yard line, sufficiently close that the team with the ball would like a measurement. Rather than the chainmen running on the field to measure the ball as is conventionally done, the other sighting laser 20 is turned on and the spotting laser 30 moved into position to visually, quickly and clearly show that football 10 is 0.1 of a yard short of the necessary 10 yards required for the first down.

The previous hypothetical example is employed to clearly indicate the advantages of an accurate sighting system to spot the football without any question or judgement on the part of the officials. The delays measuring the position of the football inherent in the game of football are also totally eliminated by omitting the necessity of the chainmen or yardage marking officials running on the field for a measurement. Other examples may, of course, be employed; however, the previous example hopefully illustrates the advantages and importance of the present invention.

Figure 3:
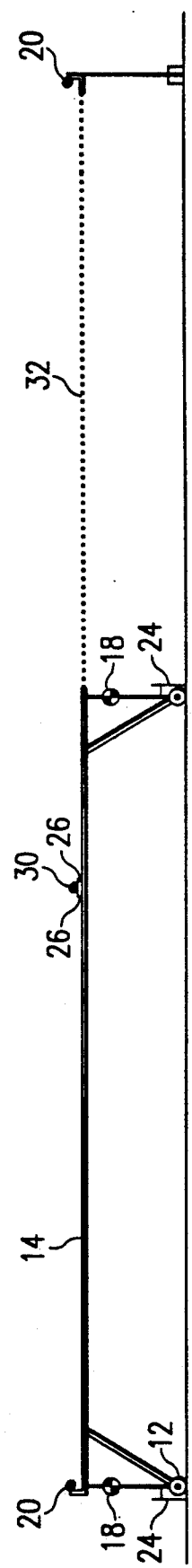
FIG. 3 is an elevation view of the preferred embodiment of the invention according to an extended mode of operation.

As shown in FIG. 3 a provision is made in each end of guide ramp 14 to remove a sighting laser 20 with an attached steel precision chain 32 that is concealed within the spotting laser guide ramp 14. This provision will allow for the extension of the sighting lasers 20 to accommodate a greater distance than 10 yards or 30 feet. Again, returning to the hypothetical example, if on the first play the team lost yardage rather than gained yardage, one sighting laser 20 is moved to the proper position and spotting laser 30 remains in place until the ball is advanced beyond its position. The reading of yardage is then taken from the steel measuring chain 32 rather than the direct reading yardage meter 26 until 10 yards or less remained.

I claim:

1. An apparatus for determining a location of a ball on a playing field relative to a distance required according to the rules of a game, the required distance having a starting point and an ending point, comprising:

a guide ramp having a length corresponding to the required distance;

movable support means for supporting said guide ramp and movable with said guide ramp along the playing field;

a spotting laser movably disposed on said guide ramp so that it can travel therealong, said spotting laser for projecting a mark onto the playing field corresponding to the position of the ball on the playing field; and a first sighting laser located at a first end of said guide ramp, for projecting a mark onto the playing field corresponding to the ending point of the required distance for a first direction of travel of the ball.

2. The apparatus of claim 1, further comprising:

a second sighting laser located at a second end of said guide ramp, for projecting a mark onto the playing field corresponding to the starting point of the required distance for the first direction of travel of the ball.

3. The apparatus of claim 2, wherein said first and second sighting lasers are each for projecting the starting point and ending point, respectively, of the required distance for a second direction of travel of the ball opposite the first direction of travel of the ball.

4. The apparatus of claim 1, further comprising:

anchor pins, for securing the location of said guide ramp to the playing field.

5. The apparatus of claim 1, further comprising:

a yardage meter coupled to said spotting laser, for indicating a distance from an end of said guide ramp.

6. The apparatus of claim 1, wherein said support means comprises:

first and second uprights, connected to first and second ends of said guide ramp, for supporting said guide ramp at a height above the surface of the playing field; and means, connected to said uprights and in contact with the field, for guiding the movement of the first and second uprights along the playing field.

7. The apparatus of claim 6, wherein said guiding means comprises wheels.

8. A method for determining a position of a ball on a playing field during a game relative to a required distance according to the rules of the game, the game having discrete game events involving motion of the ball, and the required distance having a starting point and an ending point, comprising:

projecting a mark onto the playing field at a first position of the ball, using a first sighting laser, said first sighting laser located at a first end of a guide ramp, said guide ramp having a length corresponding to the required distance and having a spotting laser located thereon which is operable to project a mark onto the playing field;

after a first game event during which the position of the ball moves in a first direction to a location within the required distance, moving said spotting laser along said guide ramp until the mark projected by said spotting laser onto the playing field corresponds to the position of the ball; and after a second game event during which the position of the ball moves in a second direction to a location outside of the required distance and behind the location of the first sighting laser, removing said first sighting laser from said guide ramp and moving it until the mark projected by said first sighting laser corresponds to the position of the ball.

9. The method of claim 8, further comprising:

after a third game event during which the position of the ball advances to a first down location beyond the required distance, moving said guide ramp until the mark projected by said first sighting laser corresponds to said first down location.

10. The method of claim 9, further comprising:

projecting a mark onto the playing field with a second sighting laser located at a second of said guide ramp, to project an indication of the end of the required distance onto the playing field.

11. The method of claim 14, wherein the game is American rules football;

and further comprising:

after a game event in which possession of the ball changes from one team to another, moving said guide ramp until the mark projected by said second sighting laser corresponds to the position of the ball.

12. The method of claim 11, further comprising:

displaying the position of the spotting laser relative to one of the first and second ends of said guide ramp.

13. The method of claim 9, further comprising:

after said step of moving the guide ramp, anchoring said guide ramp to the playing field.

14. An apparatus for determining a location of a ball on a playing field relative to a distance required according to the rules of a game, the required distance having a starting point and an ending point, comprising:

a guide ramp having a length corresponding to the required distance;

support means for supporting said guide ramp so that the guide ramp can be moved along the playing field;

a spotting laser movably disposed on said guide ramp so that it can travel therealong, said spotting laser for projecting a mark onto the playing field corresponding to the position of the ball on the playing field;

a first sighting laser located at a first end of said guide ramp, for projecting a mark onto the playing field corresponding to the ending point of the required distance for a first direction of travel of the ball;

and a second sighting laser located at a second end of said guide ramp, for projecting a mark onto the playing field corresponding to the starting point of the required distance for the first direction of travel of the ball and first and second bulls eyes, located near said first and second sighting lasers, for providing a visual indication to the playing field of the position of said first and second sighting lasers.

15. An apparatus for determining a location of a ball on a playing field relative to a distance required according to the rules of a game, the required distance having a starting point and an ending point, comprising:

a guide ramp having a length corresponding to the required distance;

support means for supporting said guide ramp so that the guide ramp can be moved along the playing field;

a spotting laser movably disposed on said guide ramp so that it can travel therealong, said spotting laser for projecting a mark onto the playing field corresponding to the position of the ball on the playing field;

first and second sighting lasers located at first and second ends of said guide ramp, respectively, said first sighting laser for projecting a mark onto the playing field corresponding to the ending point of the required distance for a first direction of travel of the ball, said second sighting laser for projecting a mark onto the playing field corresponding to the starting point of the required distance for the first direction of travel of the ball, said first and second sighting lasers for projecting the starting point and ending point, respectively, of the required distance for a second direction of travel of the ball opposite the first direction of travel of the ball; and a chain extendable from said guide ramp to a location beyond the first and second ends of said guide ramp;

wherein each of said first and second sighting lasers are connected to said chain and may be removed from the ends of said guide ramp, and are for projecting a mark on the playing field corresponding to the position of the ball outside of the required distance.

* * * * *